Patented Nov. 20, 1951

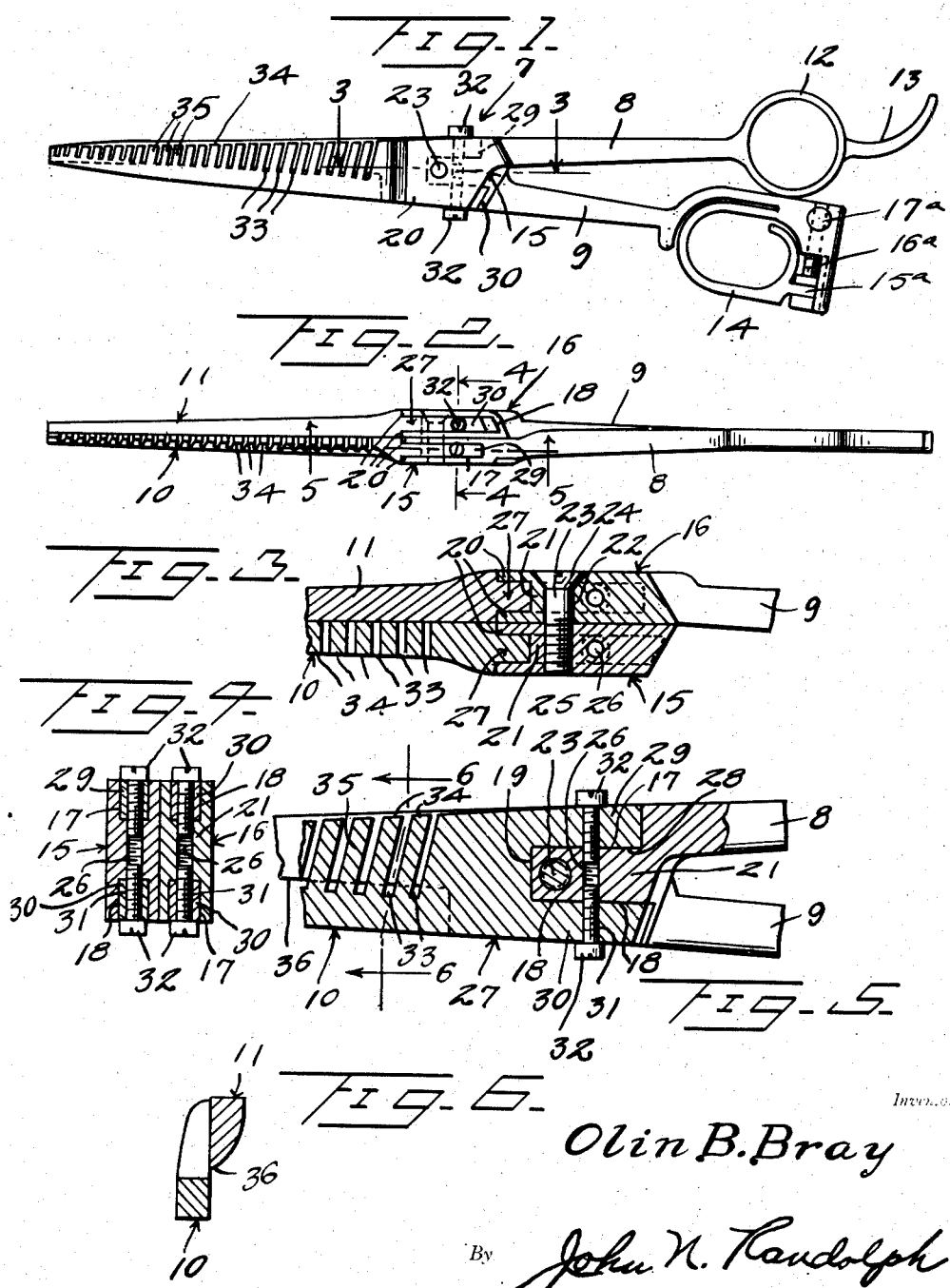

2,575,861

UNITED STATES PATENT OFFICE 2,575,861

DETACHABLE BLADE AND HANDLE FOR SHEARS

Olin B. Bray, Lynwood, Calif.

Application January 5, 1951, Serial No. 204,577

5 Claims. (Cl. 30—260)

This invention relates to a novel construction of shears for use in thinning hair and more particularly to a scissors or shears having removable blades whereby worn or dull blades may be replaced without replacing the remainder of the scissors or shears.

Another object of the invention is to provide a pair of shears having removable blades wherein a thinning blade of the shears may be replaced with a conventional cutting blade to enable the shears to be used in a conventional manner for cutting hair or as thinning shears by replacing one of the conventional cutting blades with a thinning blade, thereby eliminating the need for a separate pair of shears for thinning the hair.

Still a further object of the invention is to provide a scissors or shears having a novel connection between the shear blades and levers whereby the joints thus formed will be of adequate strength to withstand any normal operation of the shears.

Various other objects and advantages of the invention will hereinafter become more fully apparent from the following description of the drawing, illustrating a presently preferred embodiment thereof, and wherein:

Figure 1 is a plan view showing the assembled shears in a closed position;

Figure 2 is an edge elevational view thereof looking from top to bottom of Figure 1;

Figure 3 is an enlarged longitudinal sectional view taken substantially along a plane as indicated by the line 3—3 of Figure 1;

Figure 4 is an enlarged cross sectional view taken substantially along a plane as indicated by the line 4—4 of Figure 2;

Figure 5 is an enlarged longitudinal sectional view taken substantially along a plane as indicated by the line 5—5 of Figure 2, and Figure 6 is a cross sectional view taken substantially along a plane as indicated by the line 6—6 of Figure 5.

Referring more specifically to the drawing, the novel shears or scissors in its entirety is designated generally 7 and comprises a pair of levers 8 and 9 and a pair of blades 10 and 11.

The lever 8 is provided with a finger loop 12 and finger rest 13 at its outer end. The lever 9 is provided with a thumb loop 14 at its outer end only one end of which is secured to the lever 9. The thumb loop 14 is provided with a free end portion having an outwardly projecting apertured ear 15a in which a stem portion of an adjusting screw 16a is journaled. Said adjusting screw engaging a threaded socket 17a of the lever 9 for varying the size of the thumb loop 14.

The levers 8 and 9 are provided with corresponding heads 15 and 16, respectively, at their opposite, inner ends. The heads 15 and 16 are widened laterally in opposite directions and when disposed in overlapping relationship, as illustrated in the drawing, the levers 8 and 9 project therefrom in diverging relationship, as illustrated in Figure 1. The side edges and outer end of each of the heads are recessed to provide longitudinally extending oppositely opening grooves 17 and 18 and a transversely extending groove 19 which extends across the free ends of the heads and opens outwardly thereof and into the grooves 17 and 18. The grooves are spaced from the opposite sides of each of the heads 15 and 16 to provide overlying flanges 20. Each head is provided with a solid longitudinally extending central portion 21. The portion 21 of the head 16 is provided with a bore 22 to loosely receive the unthreaded shank portion of a screw 23 the head of which seats in a counter bored portion 24 of said bore 22. The portion 21 of the head 15 is provided with a similarly disposed threaded bore 25 which registers with the bore 22 to receive the threaded shank of the screw 23 for detachably and pivotally connecting the levers 8 and 9. Each head portion 21 inwardly of the screw 23 is provided with a transverse threaded bore 26, the ends of which open into the grooves 17 and 18.

The blades 10 and 11 are provided at their inner ends with relatively wide shank portions 27 of reduced thickness. Each of said shank portions, which are of the same construction, is provided with a longitudinally extending outwardly opening notch 28 forming furcations 29 and 30. The furcations 29 and 30 of the blade 10 fit into the grooves 17 and 18 of the lever 8, respectively, while the furcations 29 and 30 of the blade 11 engage the grooves 17 and 18, respectively, of the lever 9. The transverse portions of the shanks 27 which are disposed inwardly of the notches 28 snugly fit the grooves 19, as best illustrated in Figure 3. The intermediate portions 21 of the heads 15 and 16 are snugly received in the longitudinal slots 28 and the flanges 20 of the heads 15 and 16 overlie and snugly engage opposite sides of the furcations 29 and 30 and the inner portions of the blade shanks 27. The furcations 29 and 30 are provided with aligned transversely extending threaded bores 31 which align with the bores 26 when the shanks 27 are fully seated in the heads 15 and 16. A headed screw 32 is threaded inwardly through each threaded bore 31 into the adjacent end of the bore 26 which is in registry with said bore 31 so that when the screws 32 are tightened the shanks 27 are securely fastened in the heads 15 and 16.

The blade 11 is of conventional construction, except for its shank 27. The blade 10 has been illustrated as a thinning blade having transversely extending notches or slots 33 which open outwardly of its cutting edge 34 forming transversely disposed teeth 35, the terminal portions only of which are sharpened to form the cutting edge 34. The blades 10 and 11 are tapered in width from their shank ends 27 toward their outer free ends and the length of the slots 33 and teeth 35 likewise diminish toward the outer free end of the blade 10.

The sharpened terminals 34 of the blade teeth 35 function with the cutting edge 36 of the blade 11 for thinning the hair adjacent the roots in a conventional manner by cutting only a portion of the hair engaged by the scissors while the remainder of the hair, which is disposed in the slots 33 remains uncut.

It will be readily apparent that all pressure on the joints of the lever heads and blade shanks during operation of the scissors or shears 7 is in a direction either clockwise or counter clockwise of the parts as seen in Figures 1 and 5 and as the screws 32 securely hold the furcations 29 and 30 against the intermediate head portions 21 no relative movement of the lever heads and blade shanks is possible. Similarly, the flanges 20 prevent any play between the blade shanks and lever heads in directions parallel to the pivot screw 23, as seen in Figure 3, so that the blades are prevented from swinging away from one another. It will thus be readily apparent that the joint between the lever heads and blade shanks is so constructed as to afford the maximum of strength thereby enabling the pair of shear levers 8 and 9 to be utilized substantially indefinitely while the shears 7 are provided with new blades 10 and 11 to replace blades which have been worn out, damaged or become too dull for effective use. Likewise, if desired, the thinning blade 10 may be replaced by a conventional cutting blade, corresponding to the blade 11, so that the shears may be used as conventional shears or as thinning shears merely by replacing a conventional blade 11 with the thinning blade 10.

Various modifications and changes are contemplated and may obviously be resorted to, without departing from the spirit or scope of the invention as hereinafter defined by the appended claims.

I claim as my invention:

1. A pair of scissors or shears comprising a finger loop lever and a thumb loop lever, said levers having heads at their inner ends disposed in overlapping relationship, said heads being laterally widened in opposite directions, each of said heads having outwardly opening longitudinally extending grooves in its side edges and a transversely extending outwardly opening groove in its outer end, said grooves of each of the heads defining a solid longitudinally extending intermediate portion disposed between the first mentioned grooves and defining the bed of the transverse groove, a pair of shear blades each having a bifurcated shank portion of reduced thickness at its inner end, said shank portions snugly fitting into the grooves of the heads and fastening means detachably securing each shank portion to its complementary head.

2. A pair of scissors or shears as in claim 1, each of said solid longitudinally extending head portions being provided with a transverse threaded bore opening into the first mentioned grooves thereof, the furcations of said shank portions having transverse bores registering with the transverse bores of the head portions when said shank portions are fully seated in the grooves of the heads, and said fastening means comprising screws extending inwardly through the bores of the furcations and threadedly engaging the ends of the threaded bores of the lever heads.

3. A pair of scissors or shears as in claim 1, each of said solid longitudinally extending head portions being provided with a transverse threaded bore opening into the first mentioned grooves thereof, the furcations of said shank portions having transverse bores registering with the transverse bores of the head portions when said shank portions are fully seated in the grooves of the heads, and said fastening means comprising screws extending inwardly through the bores of the furcations and threadedly engaging the ends of the threaded bores of the lever heads, and a pivot screw extending through the lever heads at a right angle to said first mentioned screws and disposed between said first mentioned screws and the outer ends of the lever heads, said pivot screw turnably engaging one lever head and being threadedly connected to the other lever head.

4. A pair of scissors or shears as in claim 1, each of said solid longitudinally extending head portions being provided with a transverse threaded bore opening into the first mentioned grooves thereof, the furcations of said shank portions having transverse bores registering with the transverse bores of the head portions when said shank portions are fully seated in the grooves of the heads, and said fastening means comprising screws extending inwardly through the bores of the furcations and threadedly engaging the ends of the threaded bores of the lever heads, and a pivot screw extending through the lever heads at a right angle to said first mentioned screws and disposed between said first mentioned screws and the outer ends of the lever heads, said pivot screw turnably engaging one lever head and being threadedly connected to the other lever head, said lever heads having flanges overlying opposite sides of the blade shanks, the adjacent flanges of the two lever heads being disposed between the blade shanks whereby the blades are individually detachable from the pivotally connected lever heads and the lever heads with the blades detachably secured thereto are detachable from one another.

5. A scissors or shears as in claim 1, the longitudinally extending intermediate portions of the lever heads snugly fitting into the outwardly opening slots of the bifurcated shank portions.

OLIN B. BRAY.

No references cited.